Dec. 6, 1966 F. KLUMPP, JR., ETAL 3,290,430
ANGLE STRAP STRAIN RELIEF BUSHINGS
Filed Jan. 28, 1966 3 Sheets-Sheet 1

INVENTORS
FERDINAND KLUMPP, JR.
KERRY HEYMAN
BY
ATTORNEYS.

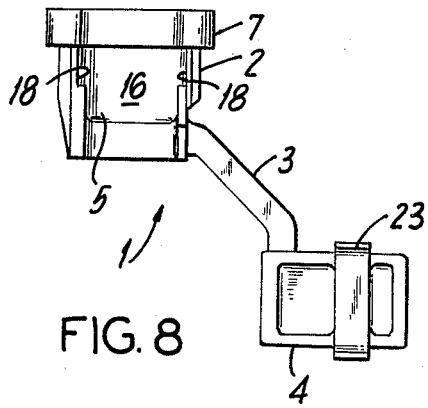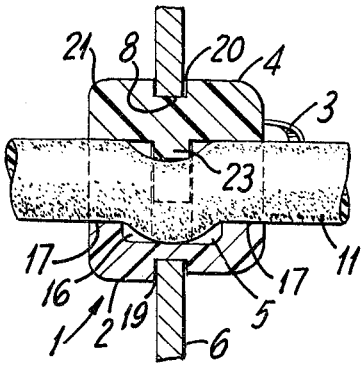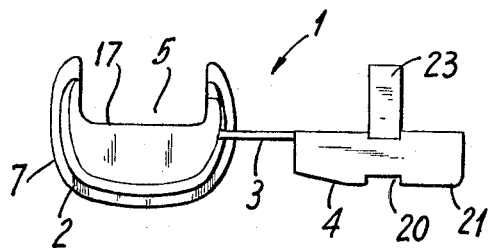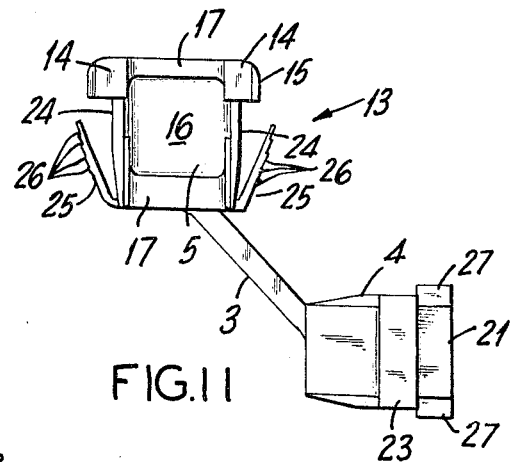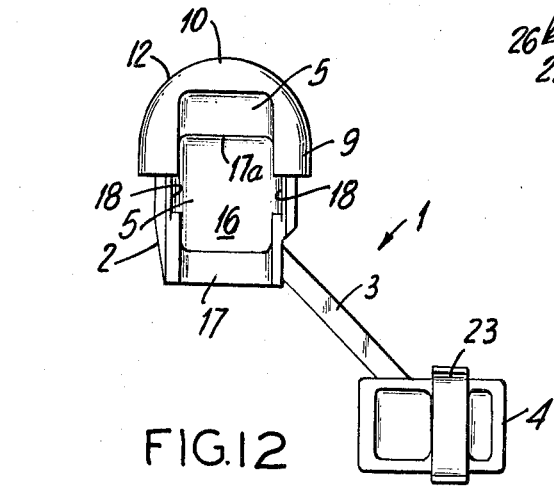

Dec. 6, 1966          F. KLUMPP, JR., ETAL          3,290,430
                   ANGLE STRAP STRAIN RELIEF BUSHINGS
Filed Jan. 28, 1966                                3 Sheets-Sheet 3

INVENTORS
FERDINAND KLUMPP, JR.
KERRY HEYMAN
BY
*Auslander + Thomas*
ATTORNEYS.

United States Patent Office 3,290,430
Patented Dec. 6, 1966

3,290,430
ANGLE STRAP STRAIN RELIEF BUSHINGS
Ferdinand Klumpp, Jr., Union, and Kerry Heyman, Summit, N.J., assignors to Heyman Manufacturing Co., Kenilworth, N.J., a corporation of New Jersey
Filed Jan. 28, 1966, Ser. No. 526,955
11 Claims. (Cl. 174—153)

The present invention is a continuation-in-part of U.S. Serial Number 371,311, filed June 1, 1964, now abandoned, and relates to a self-locking strain relief bushing for an electrical conductor comprising an integral one-piece unit including a body, a strap and a grip block.

Strain relief devices are used to firmly hold an electrical conductor such as a standard electric cord in an aperture usually in a panel associated with an electrical appliance or other electrically operated device.

The strain relief bushings of the past once engaged in the aperture with a wire leading through have usually held themselves in the aperture and firmly gripped the electric cord so that any strain exerted on the cord would impinge at the bushing rather than at the point of connection of the electric cord where damage might occur.

It has been found advantageous to provide the hollow shank of the bushing with an integral hinge or strap to the grip block so that in assembly an operator could hold the bushing in one hand while laying the wire in it and then not have to search for an inventory of grip blocks and usually one handedly be able to close the grip block in position ready for locking insertion in the aperture in a panel.

In the past the hinge at the shank had proven unsatisfactory because the pieces had to have relatively large cut-away areas in order for the pieces to rotate into position and the flexing of the hinge usually did not allow enough latitude for stretch in the bushing and oftentimes the held wires were cut or damaged by the grip block applying too much pressure.

The introduction of a strap attached from the extremity of the shank to the extremity of the grip block, substantially improved the one-piece strain bushing. The strap length provided a flexibility for an easy swing fit of the grip block and one-hand operability.

The bushing straps of the past placed at the extremity of a bushing, within a panel, whether having a bending axis at a right angle to the shank axis or crossing it were awkward. While such straps bent in such a manner as to present no protrusion beyond the tapered surface of the closed bushing, they held the free grip block on a line with the center axis of the shank of the open bushing. An extra movement was required in order to close the bushing. A wire placed in the shank tended to stretch across the grip block which had to be moved aside in order to close the bushing prior to insertion in a panel.

The strain relief bushing of the past having angulated or curved straps at the extremities of the pieces normally inside the panel with the strap being bendable with an axis crossing the centerline of the shank at a right angle was event more awkward. Not only was the grip block on a line with the wire placed in the hollow of the shank but the grip block had to be moved aside and twisted, twisting the strap before the bushing could be readied for insertion into a panel.

The extremity of the bushing within the panel seemed a logical place for the location of straps of the past since it provided no protrusion beyond the taper of the grommet, allowing the grommet with the engaged wire a smoother path into locking position in a panel.

To avoid the problems of the strap on the extremity, a shank strap and grip block were developed where the bending axis of the strap was parallel to the bending axis of the shank. While this may have seemed an improvement over the hinge and the straps connecting the inner panel extremities the side strap presented probelms too.

For easy insertion into a panel the side strap could not protrude beyond the diameter of the outer flange of the bushing and preferably protruded less than the diameter of the panel opening.

A short strap, short enough to barely protrude tended to be hard to close, especially with one hand, and had many of the disadvantages of a hinge. A long strap which was more easily closeable upon the insertion of the wire was difficult or impossible to insert into the panel. The bushing had to start to be inserted at an angle to get the strap loop behind the panel since its diameter with the protruding strap was greater than the panel opening diameter. Inserting in some cases was difficult or impossible since the angulation of the bushing for insertion with a conductor wire protruding down its centerline often provided a turning radius of the bushing for insertion with the wire protruding, in excess of the diameter of the panel opening, a problem the straight insertion or old in the panel extremity strap would not encounter since the bushing could be pushed straight into the panel without need to turn it.

According to the present invention, a strain relief bushing is provided with an angulated strap extending from the body of the bushing and holding a grip block away from the central axis of the shank beyond the width of the shank channel and yet holding the grip block free to close into the shank to hold a conductor and form a unit for insertion into a panel.

By thus disposing the strap, either from the front flange or the shank the grip block is not held on a line with the shank, having to be moved out of the way of the inserted wire upon closing the bushing. The strap may usually be a length for conveniently and easily closing the grip block over the wire in the shank since the loop protrusion of the strap presents little or no difficulty when the bushing is being inserted into a panel. The loop from the head flange of course provides no problem of protrusion while the bushing is being inserted. The bushing with the strap on the shank may require a small turn to get the angulated loop of the strap on a closed bushing past the panel opening or the bushing may be slid into the panel protruding strap loop first without any twist in of the bushing itself, guided by the angulated strap loop.

Although such novel feature or features believed to be characteristic of the invention are pointed out in the claims, the invention and the manner in which it may be carried out may be further understood by reference to the description following and the accompanying drawings.

FIG. 8 is a plan view of the type of bushing shown in FIGS. 1–5 in its opened up relationship as taken from the mold.

FIG. 9 is an end view of FIG. 8, and

FIG. 10 is a cross-section of a strain bushing of the present invention inserted in a panel and clamped to a conductor.

FIG. 11 is a plan view of another embodiment of the present invention.

FIG. 12 is a plan view of another embodiment of the present invention.

Referring now to the figures in greater detail, where like reference numbers denote like parts in the various figures.

Figure 1:
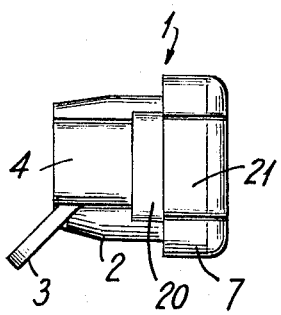
FIG. 1 is a top plan view of a strain bushing made according to the present invention.
Figure 2:
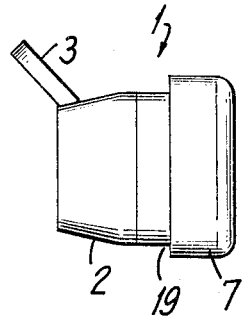
FIG. 2 is a bottom view of FIG. 1.
Figure 3:
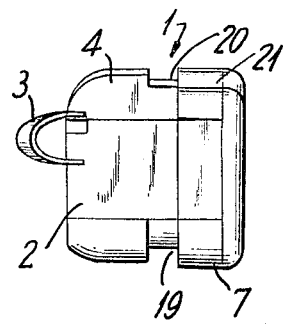
FIG. 3 is a side elevation of the device shown in FIGS. 1 and 2.
Figure 4:
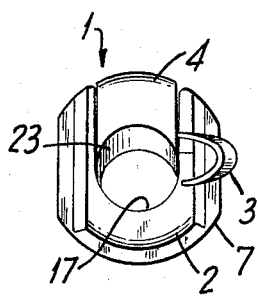
FIG. 4 is a left end view of FIG. 3.
Figure 5:
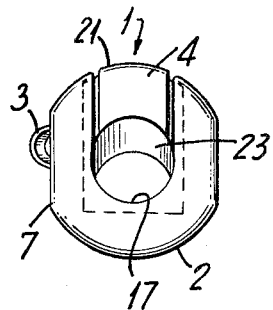
FIG. 5 is a right end view of FIG. 3.

The strain relief bushing 1 as shown in FIGS. 1–5 and 7–10 comprises a shank 2, a strap 3 and a grip block 4. The description and numbers all apply to the bushings shown in FIGS. 6, and 11–7 except that the individual differences will be dealt with in detail in description of the figures.

The shank 2 usually is molded of a hard dielectric substance such as nylon and has a hollow channel 5 passing through its center. The part of the shank, designed to face outward from the panel 6 is usually a circular flange 7 of wider diameter than the opening 8 as shown in FIG. 10 in section.

The bushing 9 as shown in FIG. 12 has a cover 10 extending beyond and covering the end of the channel 5 running through the bushing 9. The effect of this cover is to cause a conductor wire 11 to be bent at 90 degrees from the plane at which it lies in the channel 5. The end 12 of the cover 10 extends beyond the diameter of the shank 2 and serves the same function as the flange 7 of the strain relief bushing 1.

The flange 15 of the bushing 13 as shown in FIG. 11 may be modified as shown by the flattened portions 14 but in other respects is substantially similar. The flattened portions 14 serve a purpose to be dealt with infra.

A recess 16 forms a depression in the channel 5 forming in effect, lips 17 upon which a conductor 11 would normally rest when placed into the channel.

The leading edge 17a of the cover 10 serves the same purpose as the lips 17 in the other figures.

The shank 2 preferably has tracks 18 on either side of the channel 5. Around its lower portion or surrounding it is a recess 19 set just behind the flange 7. A complementary recess 20 is found in the grip block 4 just behind its flange portion 21.

The bushing 13 in FIG. 11 does not have any recesses in the grip block 4 on the shank 22.

A tongue 23 usually extends from the grip block 4 at a right angle or so as to give the grip block 4 the appearance of a T. The tongue 23 fits into the tracks 18 and extends toward the recess 16. It may be arced or curved to fit the contour of the conduction it is adapted to secure.

In use a conductor 11 is placed in the channel 5. The grip block 4 may be closed into the shank 2 riding in tracks 18 and impinging upon the conductor 11, forcing it into the recess 16. The bushing 1, 13 is then slid into the opening 8 in the panel 6 until stopped by the flange 7 and the grip block flange 21. The conductor 11 provides a pressure against the tongue 23 snapping the bushing 1, 13 lock to the panel 6 in the opening 8 at the shank recess 19 and grip block recess 20.

The tongue 23 holds the wire 11 under pressure to keep it from moving. Any tug on the conductor 11 tends to straighten the conductor which applies an upward pressure on the tongue 23 which cannot move because it is locked in the opening 8. Thereis, of course, a corresponding downward pressure exerted at the lips 17 which is also blocked by the opening 8 in the panel. The force of any pull is restricted to the bushing and cannot under normal circumstances be transmitted to the connections.

The shank 22 of the bushing 13 shown in FIG. 11 has inset sides 24 and fingers 25 extending outward at an angle toward the flange 15. The fingers 25 are resilient and have shoulders.

Upon insertion the fingers 25 close as they enter the opening 8 and tend the spring outward. The bushing 13 is stopped by the flange 15 when it reaches the panel 6 and is prevented from coming out by the shoulders 26 or the fingers being opened behind the panel 6. The shoulders adapt to various thicknesses of panel 6.

Since the fingers 25 and shoulders 26 hold the bushing 13 in the panel 6, no recess is required in the grip block 4 to catch the panel 6. Because no give is required, a uniform pressure of the tongue on the conductor 11 can be provided by having stops 27 on the grip block which are adapted to rest on the flattened portions 14 of the flange 15.

Figure 6:
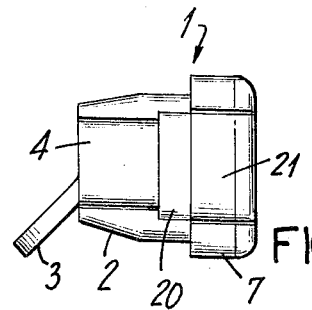
FIG. 6 is a modification of the embodiment of FIGS. 1–5.
Figure 7:
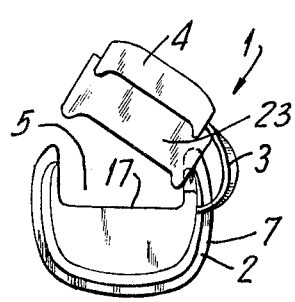
FIG. 7 shows the relationship of the two parts of the bushing preparatory to closing of a modification of the device shown in FIGS. 1–5.

In FIG. 6 the strap 3 is attached to the ends of the shank 2 and grip block. Normally, the loop formed by the closed strap 3 protrudes only a short distance beyond the diameter of the shank 2. This loop usually caused no problem insofar as getting the bushing 1, 13 into the panel is concerned. On the other hand, placing the strap 3 on the ends of the shank 2 and grip block 4 can reduce loop protrusion beyond the shank 2 diameter.

Figure 13:
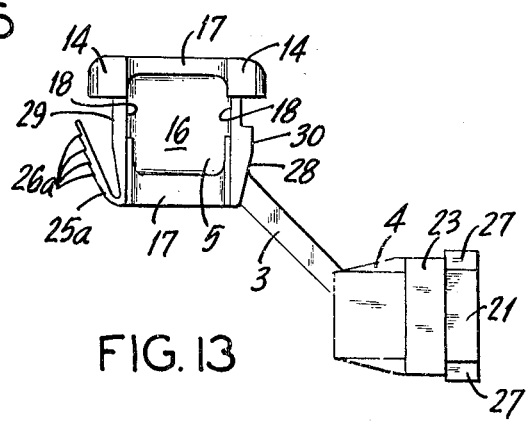
FIG. 13 is a plan view of another embodiment of the present invention.
Figure 14:
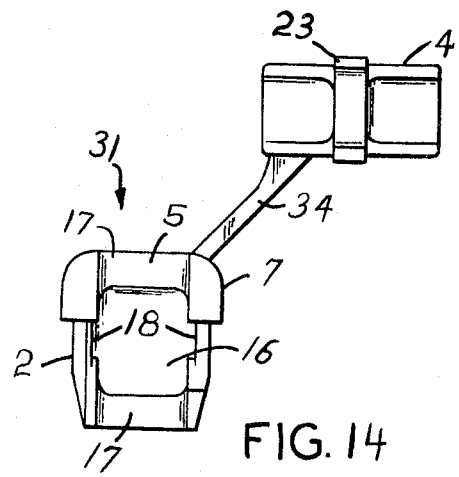
FIG. 14 is a plan view of another embodiment of the present invention.
Figure 15:
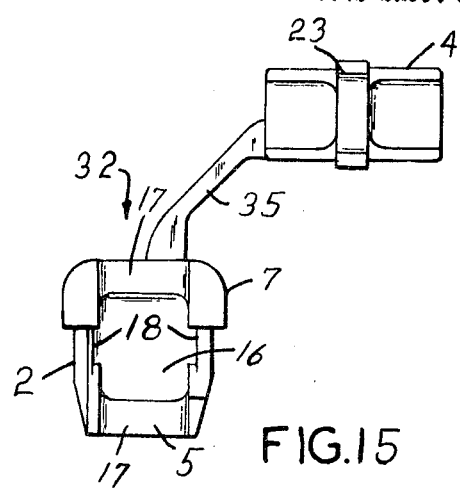
FIG. 15 is a plan view of another embodiment of the present invention.
Figure 16:
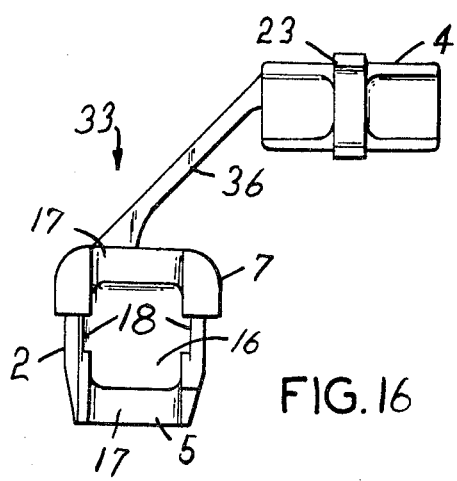
FIG. 16 is a plan view of another embodiment of the present invention.
Figure 17:
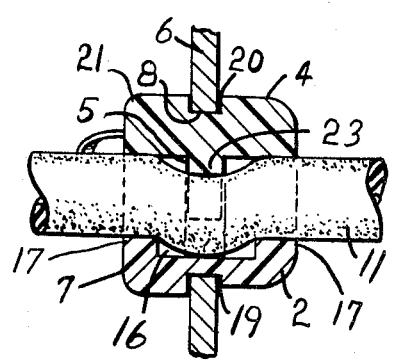
FIG. 17 is a section view showing the panel locking means of the bushings of FIGS. 14–16.

The bushing 28 as shown in FIG. 13, is provided with a modified shank 29, comprising a finger 25a with shoulders 26a, as one part of the panel locking means and a tapered portion 30 ending short of the flange 15, which provides a recess to engage the opening 8 in the panel 6. The strap 3 extends from the shank 29 at the base of the taper 30, being strongly attached thereby.

Insertion of the bushing 1, 13 requires little or no twisting since the loop preceeds the body of the shank 2 and serves as a guide to the opening 8 of the panel.

Placing the strap 3 on the end of the shank 2 or grip block 4 at an angle still holds the open grip block 4 away from the centerline of the shank 2 avoiding the extra movement of having to move the grip block away from the conductor 11 before closing.

The bushings in FIGS. 14, 15, 16 and 17 are further embodiments of the present invention having straps 34, 35, 36 extending angularly outward from the flange 7. By thus disposing the straps 34, 35, 36 the problem of limitation of internal space, jiggling to place the bushing 31, 32, 33 in the opening 8 in the panel 6 are all obviated.

While the straps 34, 35, 36 are placed at different points on the flange 7 in the various bushings 31, 32, 33 and the grip blocks 4 are joined to the straps 34, 35, 36 at different points, in each instance the bending axis of the straps 34, 35, 36 is such as to cross the centerline of the shank 2 yet hold the grip block 4 away from the width of the channel 5 thus allowing a conductor to be placed in the bushing closed over the conductor without any extra twist.

It should be noted that while the description has referred to a grip block and a shank the two parts form a unitary bushing with a substantially uniform shank section. Interchange of elements in size or shape between the grip block and shank does not change the scope of the present invention as long as the closed shank has the main combined elements of the bushing.

The terms and expressions which are employed are used as terms of description, it is recognized, though, that various modifications are possible within the scope of the invention claimed.

Having thus described certain forms of the invention in some detail, what is claimed is:

1. A one-piece relief bushing of dielectric material for holding an electric conductor in an aperture in a panel comprising a first part and a second part, said first and second parts adapted to form a shank including channel means; recess means in said channel; tongue means adapted to fit into said recess; and panel locking means, and resilient strap means adapted to join said first and second parts; said strap means normally extending at an angle on said shank from one part; said strap means including a central bending axis crossing the centerline of at least one of said parts and said strap holding said second part away from a centerline approximately the width of the channel part means of said first part when in normal position.

2. A one-piece strain relief bushing of dielectric material for holding an electric conductor in an aperture in a panel comprising a first part and a second part, said first and second parts adapted to form a shank including channel means; recess means in said channel; tongue means adapted to fit into said recess; a flange portion at one end of said shank of greater diameter than said shank; and panel locking means, and resilient strap means adapted to join said first and second parts; said strap means normally extending at an angle on said shank from one part; said strap means including a central bending axis crossing the centerline of at least one of said parts and said strap holding said second part away from a centerline approximately the width of the channel part means of said first part when in normal position.

3. A one-piece strain relief bushing of dielectric material for holding an electric conductor in an aperture in a panel comprising a first part and a second part, said first and second parts adapted to form a shank including channel means; recess means in said channel; tongue means adapted to fit into said recess; and panel locking means, and resilient strap means adapted to join said first and second parts; said strap means attached to at least the extremity of one of said parts and normally extending at an angle on said shank from one part; said strap means including a central bending axis crossing the centerline of at least one of said parts and said strap holding said second part away from a centerline approximately the width of the channel part means of said first part when in normal position.

4. A one-piece strain relief bushing of dielectric material for holding an electric conductor in an aperture in a panel comprising a first part and a second part, said first and second parts adapted to form a shank including channel means; recess means in said channel; tongue means adapted to fit into said recess; and a flange portion at one end of said shank of greater diameter than said shank; a recess behind said flange in said second part, and resilient strap means adapted to join said first and second parts; said strap means normally extending at an angle on said shank from one part; said strap means including a central bending axis crossing the centerline of at least one of said parts and said strap holding said second part away from a centerline approximately the width of the channel part means of said first part when in normal position.

5. A one-piece strain relief bushing of dielectric material for holding an electric conductor in an aperture in a panel comprising a first part and a second part, said first and second parts adapted to form a shank including channel means; recess means in said channel; tongue means adapted to fit into said recess; a flange portion at one end of said shank of greater diameter than said shank; at least two flexible fingers on the end of said shank extending outward from said shank toward said flange; each said finger having at least one shoulder portion, and resilient strap means adapted to join said first and second parts; said strap means attached to at least the extremity of one of said parts and normally extending at an angle on said shank from one part; said strap means including a central bending axis crossing the centerline of at least one of said parts and said strap holding said second part away from a centerline approximately the width of the channel part means of said first part when in normal position.

6. A one-piece strain relief bushing of dielectric material for holding an electric conductor in an aperture in a panel comprising a first part and a second part, said first and second parts adapted to form a shank including channel means; recess means in said channel; tongue means adapted to fit into said recess; means in front of said channel adapted to bend an electrical conductor; and panel locking means, and resilient strap means adapted to join said first and second parts; said strap means normally extending at an angle on said shank from one part; said strap means including a central bending axis crossing the centerline of at least one of said parts and said strap holding said second part away from a centerline approximately the width of the channel part means of said first part when in normal position.

7. A one-piece strain relief bushing of dielectric material for holding an electric conductor in an aperture in a panel comprising a first part and a second part, said first and second parts adapted to form a shank including channel means; recess means in said channel; tongue means adapted to fit into said recess; track means in said channel adapted to receive said tongue, and panel locking means, and resilient strap means adapted to join said first and second parts; said strap means normally extending at an angle on said shank from one part; said strap means including a central bending axis crossing the centerline of at least one of said parts and said strap holding said second part away from a centerline approximately the width of the channel part means of said first part when in normal position.

8. A one-piece strain relief bushing of dielectric material for holding an electric conductor in an aperture in a panel comprising a first part and a second part adapted to form a shank including channel means; recess means in said channel; tongue means adapted to fit into said recess; a flange portion at one end of said shank of greater diameter than said shank; a flexible finger on one end of said shank extending outward from said shank toward said flange portion; and a tapered portion on said shank tapering outward in the same direction as said finger said tapering portion ending before said flange portion, and resilient strap means adapted to join said first and second parts; said strap means normally extending at an angle on said shank from one part; said strap means including a central bending axis crossing the centerline of at least one of said parts and said strap holding said second part away from a centerline approximately the width of the channel part means of said first part when in normal position.

9. A one-piece strain relief bushing of dielectric material for holding an electric conductor in an aperture in a panel comprising a first part and a second part, said first and second parts adapted to form a shank including channel means; recess means in said channel; tongue means adapted to fit into said recess; and panel locking means, and resilient strap means adapted to join said first and second parts; said strap means normally extending at an angle on said bushing from one part; said strap means including a central bending axis crossing the centerline of at least one of said parts and said strap holding said second part away from a centerline approximately the width of the channel part means of said first part when in normal position.

10. A one-piece strain relief bushing of dielectric material for holding an electric conductor in an aperture in a panel comprising a first part and a second part, said first and second parts adapted to form a shank including channel means; recess means in said channel; tongue means adapted to fit into said recess; and panel locking means, and resilient strap means adapted to join said first and second parts; said strap means normally extending at an angle on said bushing from one part normally exposed at said panel; said strap means including a central bending axis crossing the centerline of at least one of said parts and said strap holding said second part away from a centerline approximately the width of the channel part means of said first part when in normal position.

11. A one-piece strain relief bushing of dielectric material for holding an electric conductor in an aperture in a panel comprising a first part and a second part, said first and second parts adapted to form a shank including channel means; recess means in said channel; tongue means adapted to fit into said recess; a flange portion at one end of said shank of greater diameter than said shank; and panel locking means, and resilient strap means adapted to join said first and second parts; said strap means normally extending at an angle on said flange from one part; said strap means including a central bending axis crossing the centerline of at least one of said parts and said strap holding said second part away from a centerline approximately the width of the channel part means of said first part when in normal position.

References Cited by the Examiner

UNITED STATES PATENTS

| | | | |
|---|---|---|---|
| 3,056,852 | 10/1962 | Sachs | 174—153 |
| 3,123,662 | 3/1964 | Fink | 174—65 |

LARAMIE E. ASKIN, *Primary Examiner.*